US006453230B1

(12) United States Patent
Geurts

(10) Patent No.: US 6,453,230 B1
(45) **Date of Patent: *Sep. 17, 2002**

(54) APPARATUS FOR HANDLING A TRAFFIC MESSAGE

(75) Inventor: Joris Hubert Joseph Geurts, Eindhoven (NL)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,712

(22) Filed: Nov. 23, 1998

(30) Foreign Application Priority Data

Dec. 2, 1997 (EP) .......................................... 97203773

(51) Int. Cl.[7] .......................... G06F 19/00; G06G 7/70; G06G 7/76; G01C 21/00; G08G 1/09

(52) U.S. Cl. ....................... 701/117; 701/118; 701/119; 701/208; 340/905

(58) Field of Search ................................ 701/203, 119, 701/118, 202, 208, 117; 340/905

(56) References Cited

U.S. PATENT DOCUMENTS

| | | | | | |
|---|---|---|---|---|---|
| 4,196,412 | A | | 4/1980 | Sluis et al. | 340/901 |
| 4,792,803 | A | * | 12/1988 | Madnick et al. | 340/905 |
| 4,907,159 | A | * | 3/1990 | Mauge et al. | 701/117 |
| 5,095,532 | A | * | 3/1992 | Mardus | 455/186 |
| 5,146,219 | A | * | 9/1992 | Zechnall | 340/995 |
| 5,164,904 | A | | 11/1992 | Sumner | 701/117 |
| 5,173,691 | A | | 12/1992 | Sumner | 340/905 |
| 5,182,555 | A | * | 1/1993 | Sumner | 340/905 |
| 5,206,641 | A | * | 4/1993 | Grant et al. | 340/905 |
| 5,257,023 | A | | 10/1993 | Furuya | 340/995 |
| 5,303,401 | A | * | 4/1994 | Duckeck et al. | 455/186.1 |
| 5,438,687 | A | * | 8/1995 | Suchowerskyj et al. | 455/158.4 |
| 5,465,088 | A | * | 11/1995 | Braegas | 340/905 |
| 5,504,482 | A | | 4/1996 | Schreder | 340/995 |
| 5,568,690 | A | | 10/1996 | Hirota et al. | 701/201 |
| 5,635,924 | A | | 6/1997 | Tran et al. | 340/905 |
| 5,636,245 | A | | 6/1997 | Ernst et al. | 375/259 |
| 5,712,632 | A | | 1/1998 | Nishimura et al. | 340/995 |
| 5,784,691 | A | | 7/1998 | Rühl | 455/186.1 |
| 5,908,464 | A | * | 6/1999 | Kishigami et al. | 701/208 |
| 5,911,773 | A | * | 6/1999 | Mutsaga et al. | 701/200 |
| 6,073,075 | A | * | 6/2000 | Kondou et al. | 701/203 |
| 6,266,608 | B1 | * | 7/2001 | Pertz | 701/200 |

FOREIGN PATENT DOCUMENTS

| | | | |
|---|---|---|---|
| EP | 0478438 A1 | 4/1992 | G08G/1/0969 |
| EP | 0756153 A2 | 12/1996 | |
| FR | 2554618 | 11/1983 | |

OTHER PUBLICATIONS

"Location Referencing Rules for RDS–TMC", European Road Transport Telematics Implementation Co–ordination Organisation, Task Force on Geographical Location Referencing, CORD Project V 2056, Deliverable No. D010, Aug. 1995.

European pre–standard prENV/278/4/1/0010, English Version, Traffic and Traveller Information (TTI), Version 2.01, Revised Version, Oct., 1995.

Event List (Normative) prENV/278/4/1/0009, Annex A, Oct. 23, 1995.

* cited by examiner

*Primary Examiner*—Jacques H. Louis-Jacques
*Assistant Examiner*—Brian J. Broadhead
(74) *Attorney, Agent, or Firm*—Mayer, Brown, Rowe & Maw

(57) ABSTRACT

A geographical region is divided into a number of areas according to a pre-defined standard. The apparatus filters received traffic messages and only those that relate to a particular one of the defined areas are passed on for processing. According to the invention, an area of interest is specified by expanding the particular defined area in at least one direction.

8 Claims, 3 Drawing Sheets

APPARATUS FOR HANDLING A TRAFFIC MESSAGE

BACKGROUND OF THE INVENTION

An apparatus and method relating to handling a traffic message are described in the German patent application published under number DE 42 30 294 A1. The known apparatus is employed in a receiver for traffic messages according to the Radio Data System (RDS) Traffic Message Channel (TMC). According to RDS TMC, the traffic message is digitally coded and broadcast in parallel with the audio program. So when a traffic message is received, the audio program is also continued to be broadcast and the presentation of the audio is not be interrupted. The traffic message comprises in a coded way, an event indicating circumstances of importance to the traffic and a location to which the event relates. Examples of a traffic message are a traffic queue at a certain location on a highway and fog in a certain part of the country. After reception, the traffic message is decoded and presented to the user as an acoustic message and/or as a visible message is decoded and presented to the user as an acoustic message and/or as a visible message on a display.

The list of available location codes,is maintained by some standardization body in the relevant country, e.g. under the responsibility of the Ministry of Traffic of that country. A location code may indicate a single geographical position, a line between two positions and an area enclosed by a number of positions. Because the locations are coded, the location code of a traffic message can only relate to a location that has been defined in advance by the standardization body.

According to RDS TMC, a certain geographical region of interest, e.g. a country, is divided into a certain number of pre-defined areas. The known apparatus has the ability to filter the traffic messages and to present only those traffic messages that relate to a location in one or more of these areas. To this end, the user of the known apparatus indicates one or more areas for which traffic messages are to be presented. When an area has been indicated, all traffic messages with a location related to that area are presented to the user. If a user desires the presentation of traffic messages outside this area, he must indicate one or more further areas for which traffic messages are to be presented. A problem then occurs that all traffic messages of the original area and those of the further area or areas are presented and this may result in a relatively large number of traffic messages, of which a substantial part is not of interest to the user. This is the more true if the areas have a considerable size.

SUMMARY OF THE INVENTION

The invention relates to an apparatus for handling a traffic message. The apparatus comprises indication means for indicating a first area, a receiver for reception of the traffic message comprising an event and a location to which the traffic message relates, and a filter for determining whether the location is inside the first area and, if such is the case, passing on the traffic message for processing.

The invention further relates to an RDS TMC receiver comprising such an apparatus. The invention also relates to a navigation system comprising such an apparatus.

The invention further relates to a method of handling a traffic message. The method comprises an indication step indicating a first area, a reception step receiving the traffic message comprising an event and a location to which the traffic message relates, and a filtering step determining whether the location is inside the first area and, if such is the case, passing on the traffic message for processing.

It is an object of the invention to provide an apparatus of the kind set forth with an improved mechanism for filtering traffic messages. This object is achieved according to the invention in an apparatus that is characterized in that the apparatus further comprises expansion means for expanding the first area to a second area in at least one geographical direction by an expansion factor that is substantially smaller than the length of the first area in that geographical direction, and that the filter is arranged for determining whether the location is inside the second area and, if such is the case, passing on the traffic message for processing. The apparatus of the invention allows the definition of a new area of interest that is more according to the needs of the user. While in the known apparatus only complete pre-defined areas can be added to the first area, the new area according to the invention may be the first area to which a relatively small extension has been added. This is for instance advantageous where the user travels along the border of the first area and is interested in traffic messages from just across the border in the adjacent area, but does not want to be presented all traffic message from the adjacent area. Traffic messages from just across the border can be of interest for various reasons such as a traffic message with a weather report like the chance of fog or snow, since influence of these weather conditions will not precisely stop at the border; the user may be driving towards the adjacent area, but not yet interested in all traffic messages from that adjacent area; and the route followed may lead temporarily through the adjacent area.

The expansion of the first area into the second area results in the situation of partially overlapping areas. It is to be noted that this is different from the situation described in FIG. 5 of the patent document DE 42 30 294 A1, where the pre-defined areas overlap, simply because they have been defined that way. According to the invention, the area as defined beforehand is taken as input and expanded by the apparatus to fulfil the specific needs of the user. Also in the known situation of pre-defined overlapping areas, the apparatus of the invention may advantageously be used to expand such an area to an area that is more suitable to the user. Expanding the first area in all directions may be accomplished by enlarging an area with given co-ordinates by a certain factor. This apparatus also may be arranged to allow the user to specify the amount by which the first area is to be expanded. This gives the user the possibility to precisely define the second area, from which the traffic message are to be presented.

An RDS TMC receiver according to the invention is advantageously equipped with an apparatus according to the invention. The user of such a receiver is then able to precisely define the area from which traffic messages are to be presented.

A navigation system according to the invention is advantageously equipped with an apparatus according to the invention. The navigation system guides a driver along a route from an origin to a destination, based on information from a local road database. The received traffic message comprises information concerning the traffic conditions on the roads that is more actual than the information in the local database. The navigation system uses the information from the traffic message to inform the driver of events in relation to the route and/or may investigate whether an alternative route is better than the current one in view of the received actual information. Using the apparatus according to the invention, it is more precisely determined which traffic messages are to be processed by the navigation system. Reducing the number of traffic messages to be processed is advantageous since this reduces the computation effort involved.

It is a further object of the invention to provide a method of the kind set forth with an improved mechanism for filtering traffic messages. This object is achieved according to the invention in an apparatus that is characterized in that the method further comprises the step of expanding the first area to a second area in at least one geographical direction by an expansion factor that is substantially smaller than the length of the first area in that geographical direction, and that the filtering step includes determining whether the location is inside the second area and, if such is the case, passing on the traffic message for processing. By expanding the first area to the second area, an area of interest can be obtained that is more in line with the needs of the user. By using this second area as the basis for the filter, the traffic messages that are processed better match the actual need.

Further advantageous embodiments of the invention are described below and recited in the appended claims.

BRIEF DESCRIPTION OF THE DRAWINGS

The invention and its attendant advantages will be further elucidated with the aid of exemplary embodiments and the accompanying schematic drawings, whereby.

Corresponding features in the various Figures are denoted by the same reference symbols. It should be understood that the present invention is not limited to the preferred embodiment illustrated.

DETAILED DESCRIPTION OF THE PREFERRED EMBODIMENT

Figure 1:
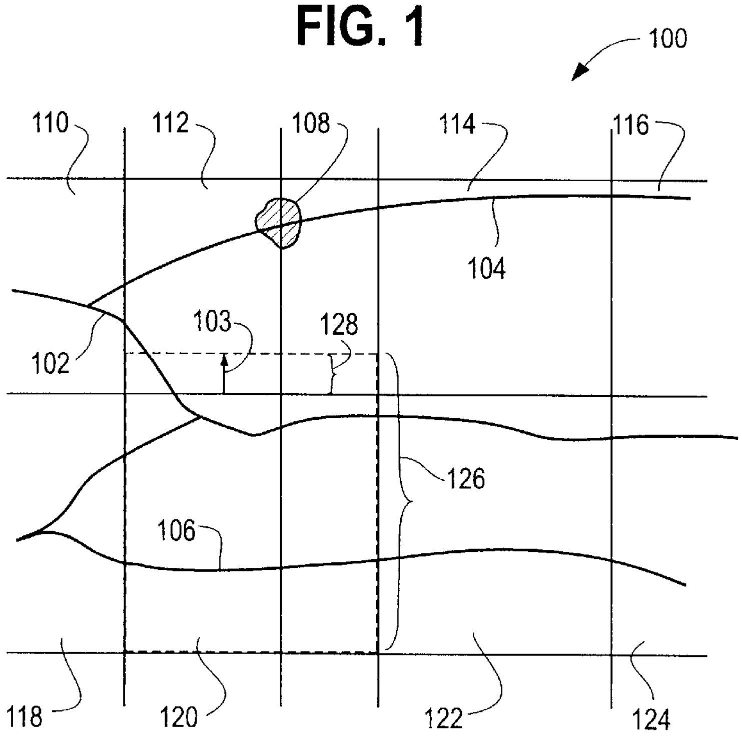
FIG. 1 shows a geographical region divided into areas and comprising a number of roads.

FIG. 1 shows a geographical region divided into areas and comprising a number of roads. The region 100 comprises a number of roads, for instance roads 102, 104 and 106, and a city 108. The region has been partitioned into a number of areas, like areas 110, 112, 114, 116, 118, 120, 122 and 124. According to RDS TMC, each area is given a location code and an area is later referred to by and identified through its location code. The data carrier of the apparatus according to the invention, like the IC Card used in the RDS TMC receiver to decode the traffic message, may comprise the location codes of the defined areas and the geographical co-ordinates spanning the area. A traffic message comprises an event and a location indicating the position where the event takes place. The location is specified in the traffic message as a code and the data carrier contains the definition of this code. In this way, the traffic message can be decoded and presented to the user in a directly interpretable format. Based on the geographical co-ordinates of the location in the traffic message, it can be determined to which area the particular message relates. This makes it possible to filter traffic messages based on area of interest to the driver. Then only traffic messages that relate to one or more indicated areas are passed on for processing and the other traffic messages are discarded. This reduces the number of traffic messages that are to be processed, e.g. to be presented to the driver of the car.

If a traffic message has a location that corresponds to a single geographical position, it can easily be determined whether that traffic message relates to the area of interest by checking whether that position is inside that area. However, a traffic message may relate to a location which is not a single position but which covers a certain part of the region. This can for instance be a weather report or bad travel conditions for such a part. In such a case, the test whether the traffic message relates to the area of interest is not a check whether a single position is inside that area but a check whether there is some overlap between the positions covered by the traffic message and the area of interest.

The apparatus according to the invention allows indicating an area of interest, which does not coincide with areas that have been defined in advance. In the example of FIG. 1, an area of interest 126 has been defined on the basis of previously defined area 120 with an extension 128 added to it. The area 126 is created by expanding area 120 into the geographical direction 130, which may be North as defined by the map of region 100. As a consequence, traffic messages that are just outside area 120 in direction 130 are still processed.

Figure 2:
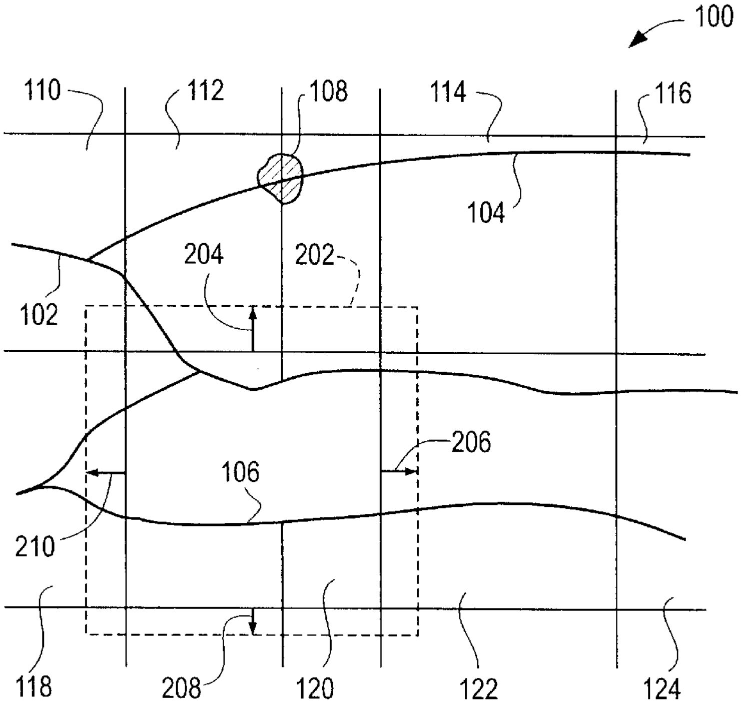
FIG. 2 shows an example of an expansion of an area into all geographical directions.

FIG. 2 shows an example of an expansion of an area in all geographical directions. The area of interest 202 is created by expanding area 120 in all 4 geographical directions, i.e. in directions 204, 206, 208 and 210. It is easy to enter into the apparatus according to the invention that such an expansion is desired. This may be indicated, for example, via a simple toggle switch.

The amount by which a pre-defined area is to be expanded can be a default value in the apparatus. However, the value may also be manually entered or modified, enabling the driver to more precisely specify the area of interest. This may be implemented in a number of ways, such as a selection from a list of possible values, whereby a next value is chosen by repeatedly pressing a button. However, it may also be implemented in other ways, such as entering a value through a numerical keypad.

Figure 3:
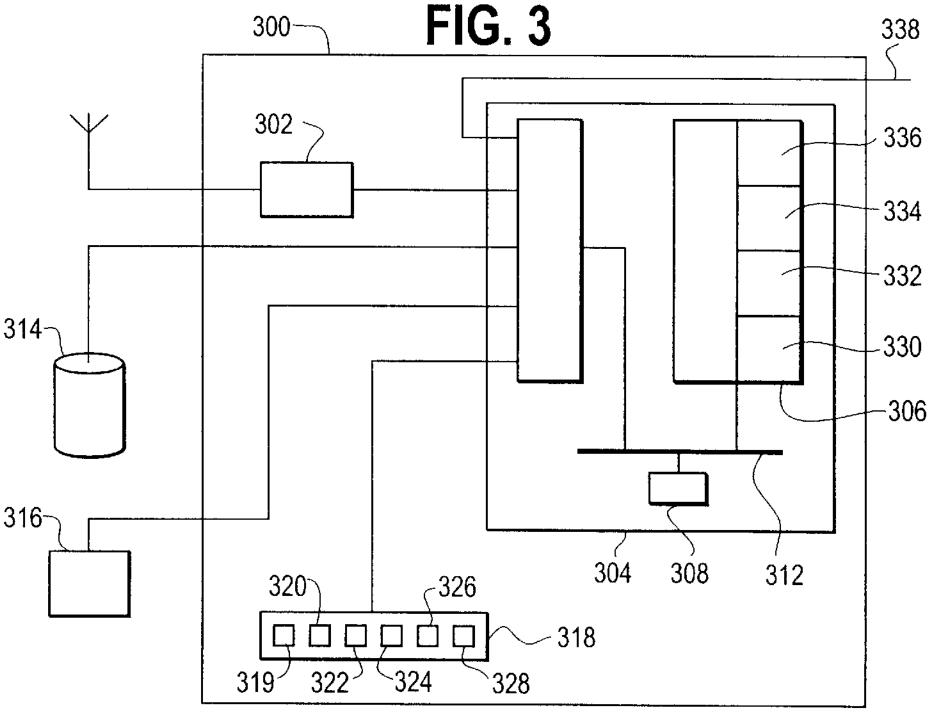
FIG. 3 schematically shows the apparatus according to the invention.

FIG. 3 schematically shows the apparatus according to the invention. The apparatus 300 comprises a receiver 302 for the reception of a traffic message. The traffic message is passed on to a unit 304 for evaluation. The unit 304 may be implemented according to known computer architecture. The unit 304 comprises a working memory 306 for storing software modules for carrying specific tasks. Processor 308 is arranged to execute the instructions of the software modules loaded in the working memory 306. The unit further comprises an interface 310 for communication with various peripheral devices and a bus 312 for the exchange of instructions and data between the various components. The apparatus can access a storage device 314 comprising the definition of the codes for the events and locations in the traffic messages and for the pre-defined areas. The storage device may be implemented as magnetic disk, optical disk, tape, IC Card or other suitable device.

The apparatus may optionally be arranged to access a display 316 to support the entering of commands or data by the user. The apparatus further comprises a key arrangement 318 of keys for operating the apparatus. This includes an indication key 319 for indicating an area as being the area of interest, a key 320 for activating the expansion means and an input key 322 for entering the value of the expansion factor.

Keys 320 and 322 may be integrated into a single key with multiple functions. The key arrangement further comprises a pre-set key 324 for activating the filter operation of the apparatus with an earlier indicated area of interest that has been stored under the pre-set key. Optionally comprised are an up-key 326 and a down-key 328 for scrolling through a list of choices displayed on display 316. The up- and down-keys may be integrated in a single key having respective up- and down-positions.

Specific software modules that are loaded into the working memory 306 are filter 330 and expansion means 332. In the particular embodiments, a module constituting indication means 334 for indicating a certain area as area of interest and a module constituting input means 336 for enabling the user to enter the expansion factor are loaded into the working memory. When it has been established in the apparatus that a particular traffic message relates to the area of interest, it is passed on via output 338 for subsequent processing. This processing may be the presentation of the traffic message to the user, either in an acoustical way via a speaker or in a visible way via a display. The processing may also involve the evaluation of the message in a navigation system as to whether the traffic message has influence on the planned route.

Figure 4:
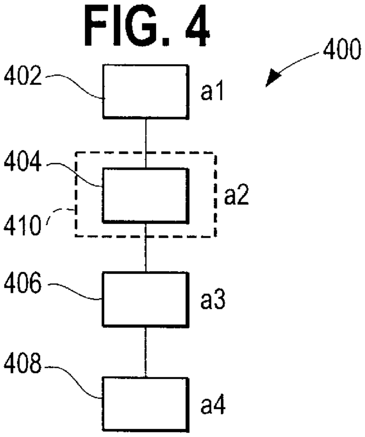
FIG. 4 shows the indication of the area of interest from a list.

FIG. 4 shows the indication of the area of interest from a list. The selectable areas are displayed to the user as a list of entities. In this example the user can choose the area of interest from 4 areas. The list 400 comprises 4 entries each corresponding to a respective area that can be indicated as area of interest. Entry 402 corresponds to an area named "al", entry 404 corresponds to an area named "a2", entry 406 corresponds to an area named "a3" and entry 408 corresponds to an area named "a4". The user can move a marker 410 up and down the list by pressing the up-key 326 and the down-key 328 shown schematically in FIG. 3 respectively. The marker may be implemented in one of various ways. Some examples are a transparent box around the relevant entry, an arrow pointed toward the entry or a highlight of the entry. A particular entry is selected by pressing key 319 shown in FIG. 3 when the marker is on that entry. The area that corresponds to the particular entry is then indicated as area of interest. In the example of FIG. 4, pressing key 319 would make area "a2" the area of interest.

Figure 5:
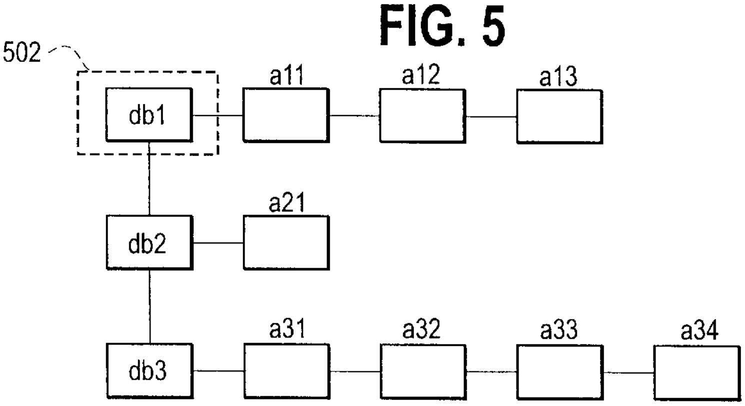
FIG. 5 shows the indication of the area of interest when multiple databases are present.

FIG. 5 shows the indication of the area of interest when multiple databases are present. According to RDS TMC, a database comprises a certain geographical region for which the roads and locations are uniquely defined. A data carrier may contain a plurality of databases, which are mutually independent and each covering a certain geographical region. In a database, a number of areas can be defined which are selectable as an area of interest for the purpose of filtering traffic messages. In case of a data carrier comprising more than one database, the user must first indicate which database is to be used and subsequently may indicate an area of interest from that database.

The data carrier of the example comprises database "db1" with 3 selectable areas, database "db2" with 1 selectable area and database "db3" with 4 selectable areas. As a first step, a list with 3 database entries is displayed and the user can move a marker 502 along this list. By pressing a confirmation key, the database on which the marker currently resides is selected. Then in a subsequent step, the selectable areas are displayed as a list of entries and an area of interest can be indicated in the way as described above for the example of FIG. 4. If the user selects a database that has only one selectable area, in the example database "db2" with area "a21", then the step of presenting a list of selectable areas is skipped and the one area is indicated as begin the area of interest. If the data carrier comprises only one database, then the step of presenting the selectable databases is skipped and the one database is directly selected. This eases the operation of the apparatus by the user, who then has a step less to perform.

Figure 6:
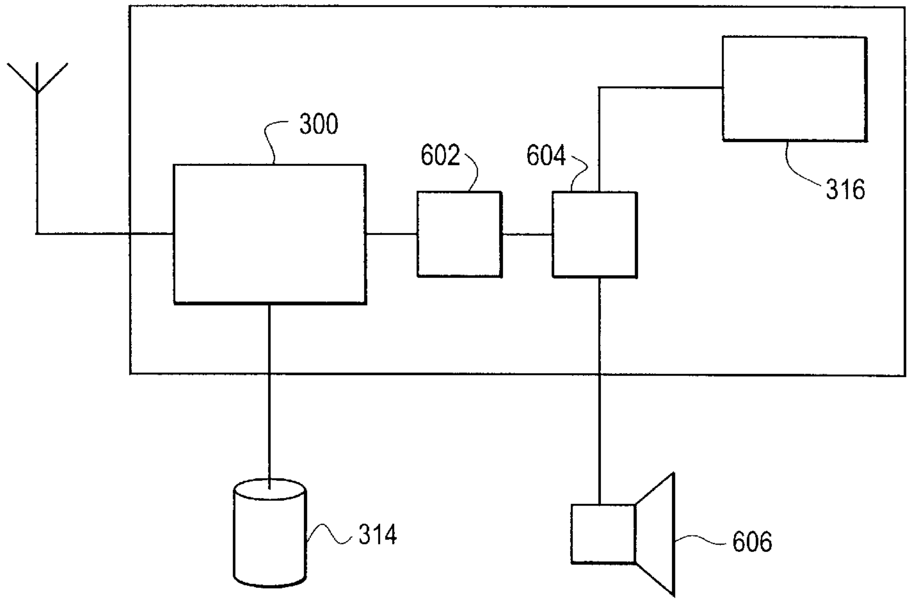
FIG. 6 schematically shows an RDS TMC receiver according to the invention.

FIG. 6 schematically shows an RDS TMC receiver according to the invention. The RDS TMC receiver 600 comprises an apparatus 300 as described above. The storage device 314 in this example is an IC Card comprising the events and locations standardized according to RDS TMC. A received traffic message is handled by apparatus 300. When it has been determined that the message must be processed, it is passed on to a store 602. From here the message is presented to the user at a convenient time by a presentation unit 604. The presentation may involve a visible message on display 316 and/or an acoustical message produced via speaker 606. The store 602 and the presentation unit 604 may be integrated in the apparatus 300 as described above in reference to FIG. 3. The store 602 can be implemented as a storage space in the working memory 306 from FIG. 3 and the presentation unit 604 can be implemented as a software module loaded into the working memory 306 for execution.

Figure 7:
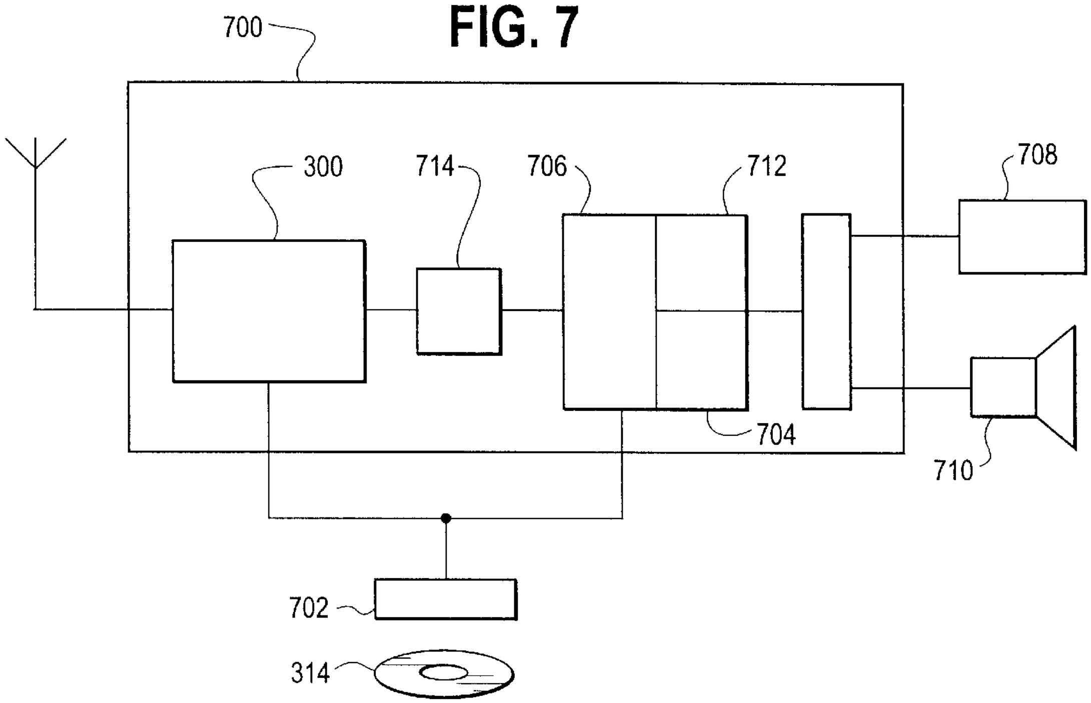
FIG. 7 schematically shows a navigation system according to the invention.

FIG. 7 schematically shows a navigation system according to the invention. The navigation system 700 uses a map database stored on a data carrier 314. The data carrier of this example is a CD-ROM in order to be able to store the large amount of information and is accessed via a reader 702. The navigation system has a planning module 704 for planning a route between an origin and a destination. The route is planned in such a way that a certain criterion, for instance minimal travel time, is optimal. The planning module plans on the basis of information in database. The navigation system further comprises a guidance module 706 for giving guidance information to follow the planned route. The guidance information may be given to the user as visual directions via a display 708 and as audible directions via speaker 710. The display 708 is larger and of higher quality than the display 316 used in an RDS TMC, since display 708 must be able to display a map with roads and places including their names. However, the functionality of display 316 from FIG. 3 may be taken over by display 708. The display 708 and the speaker 710 are accessed via interface 712.

The navigation system further comprises apparatus 300 as described above in reference to FIG. 3. The information concerning the codes of events and location is stored on the CD-ROM 314 which is accessed via reader 702. When a received traffic message has been handled by apparatus 300 and is to be processed, it is stored in store 714. The navigation system then uses the actual, dynamic information from the traffic message to complement the static information in the map database. It may be that the newly received information makes it necessary to use another route to the destination.

The pre-set key 324 of the apparatus 300 in FIG. 3 is used to store and activate respective filters for the traffic messages that are to be processed. For storing a filter, the user specifies the respective filters, e.g. by indicating the area of interest, and assigns this specification with a certain identification to the pre-set key. The identification may be a number or a name under which the filter will be known to the user. In this way, a number of filters may be stored in the apparatus. For activating a filter, the user chooses one of the stored filters, e.g. by repeatedly pressing the pre-set key until the desired filter appears on the display 316 and then acknowledges that the chosen filter is to be activated, e.g. by pressing the indication key 319. The filter may be defined as a single pre-defined area or as number of these pre-defined areas, e.g. for a corridor through which the user will drive. Since multiple databases are allowed in the apparatus, the definition of the filter will comprise an identification of the database from which the indicated area had been selected. Furthermore, the filter may be based on one or more areas that are expanded according to the invention.

The traffic message originates from a so-called service provider. The service-provider collects data about the traffic in a certain geographical region, e.g. a country, in one of various ways. Examples,,are: surveillance cameras along the roads, police reporting traffic queues, service cars and airplanes for watching traffic congestion. The broadcast traffic message comprises an identification that indicates the service provider who is responsible for the contents of the message. The apparatus 300 may be arranged to filter on the basis of the identity of the service provider. Then only traffic messages that originate from the indicated service provider will be passed on for processing, e.g. presented to the user. This type of filtering may be executed in combination with the filtering based on an area or number of areas. Furthermore, this type of filtering may be used for the pre-set filter stored and activated through the pre-set key. Such pre-set filter may also be based on the identity of the service provider in combination with an area of interest.

It will be apparent to those skilled in the art that modifications and variations can be made in the design and construction of the apparatus for handling a traffic message without departing from the scope or spirit of the invention.

I claim:

1. An apparatus for handling a traffic message, the apparatus comprising:

indication means for indicating a first area with a predetermined length, a receiver for reception of the traffic message comprising an event and a location to which the traffic message relates, a filter for determining whether the location is inside the first area and, if such is the case, passing on the traffic message for processing, characterized in that the apparatus further comprises expansion means for expanding the first area to a second area in at least one geographical direction by an expansion factor that is substantially smaller than the predetermined length of the first area wherein the total length of the first and second area is less than a multiple of the predetermined length of the first area in that geographical direction, and that the filter is arranged for determining whether the location is inside the second area and, if such is the case, passing on the traffic message for processing; and a pre-set key, whereby the apparatus is arranged to, in a first mode, enable the user to assign the first area to a pre-set key, and to in a second mode, activate the filter for the first area thus assigned.

2. An apparatus as claimed in claim 1, wherein the expansion means is arranged to expand the first area to the second area in all geographical directions.

3. An apparatus as claimed in claim 1 further comprising input means for entering the expansion factor by a user.

4. An apparatus as claimed in claim 1 further comprising a list of entries corresponding to respective pre-defined areas, wherein the indication means is arranged to enable a user to scroll through the list with entries and to select the current indicated entry from the list to indicate the desired first area.

5. An apparatus as claimed in claim 1 further comprising:

a number of databases, each including a number of entries for respective first areas, and wherein the indication means enables a user to select a particular database;

wherein if the selected database includes a plurality of entries for respective areas, enable the user to select a particular entry to indicate the desired first area; and wherein if the selected database includes a single entry, indicates that the corresponding area is the desired first area.

6. An RDS TMC receiver for handling a traffic message, the receiver comprising:

indication means for indicating a first area with a predetermined length, a receiver for reception of the traffic message comprising an event and a location to which the traffic message relates, a filter for determining whether the location is inside the first area and, if such is the case, passing on the traffic message for processing, characterized in that the apparatus further comprises expansion means for expanding the first area to a second area in at least one geographical direction by an expansion factor that is substantially smaller than the predetermined length of the first area wherein the total length of the first and second area is less than a multiple of the predetermined length of the first area in that geographical direction, and that the filter is arranged for determining whether the location is inside the second area and, if such is the case, passing on the traffic message for processing; and a pre-set key, whereby the apparatus is arranged to, in a first mode, enable the user to assign the first area to a pre-set key,. and to in a second mode, activate the filter for the first area thus assigned.

7. A navigation system having the capability of receiving a traffic message, the system comprising:

indication means for indicating a first area with a predetermined length, a receiver for reception of the traffic message comprising an event and a location to which the traffic message relates, a filter for determining whether the location is inside the first area and, if such is the case, passing on the traffic message for processing, characterized in that the apparatus further comprises expansion means for expanding the first area to a second area in at least one geographical direction by an expansion factor that is substantially smaller than the predetermined length of the first area wherein the total length of the first and second area is less than a multiple of the predetermined length of the first area in that geographical direction, and that the filter is arranged for determining whether the location is inside the second area and, if such is the case, passing on the traffic message for processing; and a pre-set key, whereby the apparatus is arranged to, in a first mode, enable the user to assign the first area to a pre-set key, and to in a second mode, activate the filter for the first area thus assigned.

8. A method of handling a traffic message comprising:

indicating a first area selected from a group of predefined areas which are each identified by a location code, the first area having a predetermined length, receiving the traffic message comprising an event and a location to which the traffic message relates, determining whether the location is inside the first area and, if such is the case, passing on the traffic message for processing, expanding the first area to a second area in at least one geographical direction by an expansion factor that is substantially smaller than the predetermined length of the first area wherein the length of the first and second area is less than a multiple of the predetermined length of the first area in that geographical direction, and determining whether the location is inside the second area and, if such is the case, passing on the traffic message for processing providing a pre-set key to enable a user to assign the first area to the pre-set key in a first mode, and in a second mode, activate the filter for the first area thus assigned.

* * * * *